E. D. BARRETT.
PRESSER-BARS FOR PLANING-MACHINES.

No. 193,313. Patented July 24, 1877.

WITNESSES

INVENTOR
E D Barrett,
By his Attorneys,

UNITED STATES PATENT OFFICE.

EMERY D. BARRETT, OF SPRING LAKE, MICHIGAN, ASSIGNOR TO HIMSELF AND WILLIAM M. BARRETT, OF SAME PLACE.

IMPROVEMENT IN PRESSER-BARS FOR PLANING-MACHINES.

Specification forming part of Letters Patent No. 193,313, dated July 24, 1877; application filed January 17, 1877.

*To all whom it may concern:*

Be it known that I, EMERY D. BARRETT, of Spring Lake, in the county of Ottawa and State of Michigan, have invented certain new and useful Improvements in Wood-Planing Machines, of which the following is a specification:

My invention especially relates to a machine of the class designed for planing or dressing both sides of the stuff which is passed through it; and my object is to prevent the indenting of the upper or first-dressed side of the material being planed as it passes beneath the presser-bar, and obviate the tendency, caused by the presence of foreign substances, to clog or bind the boards as they pass through the machine between the presser-bar and lower cutter.

My improvement consists in providing the presser-bar, between which and the rotating cutter-head the stuff to be dressed is passed, with a number of clearing teeth or cleats, arranged at suitable distances apart, which project at their front ends in advance of the presser-bar, and whose under surfaces extend below the bar, whereby, as the stuff passes between the bar and cutter-head, all substances, such as chips, shavings, &c., which would be liable to indent the stuff when carried beneath the bar, as well as have a tendency to retard the free passage of the material between the bar and cutter-head, are directed between the projecting points or teeth, and pass through the spaces between them (the top of the material being planed) and the under side of the presser-bar.

My improvement also consists in securing the cleats or teeth in the presser-bar so as to be readily detached therefrom for the insertion of others.

The pressing and clearing points or cleats are applicable to any of the ordinary presser-bars, which are arranged above the material worked, whether said bars work at their ends in upright guides, swing horizontally on pivots at their ends, or rock vertically.

Figure 1:
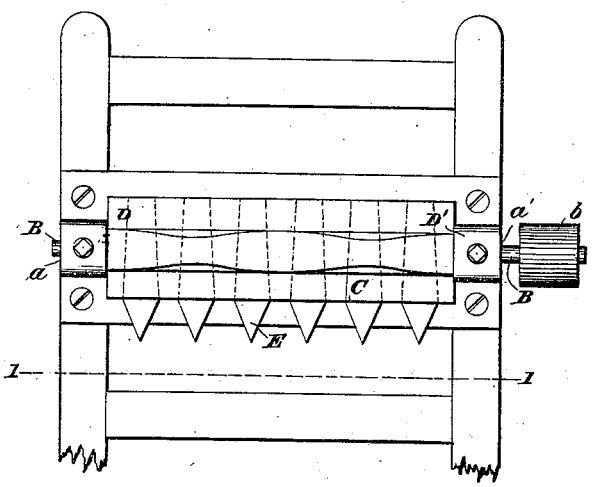
Figure 2:
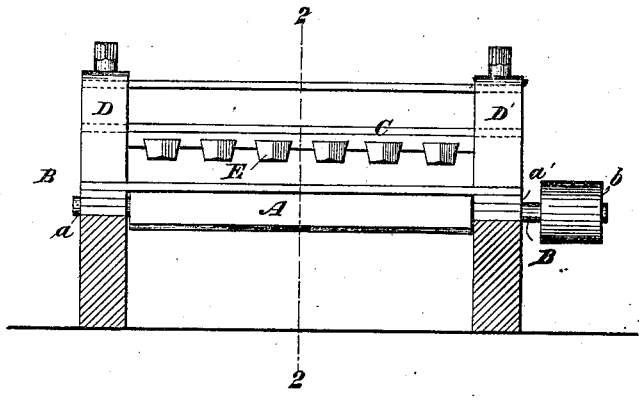
Figure 3:
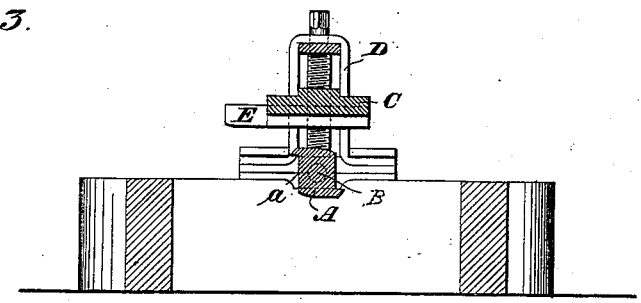

In the accompanying drawings, which show so much of a planing-machine as is necessary to illustrate the invention herein claimed, Figure 1 is a plan or top view; Fig. 2, a vertical section on the line 1 1 of Fig. 1, and Fig. 3 a similar section on the line 2 2 of Fig. 2.

The drawings represent the back end of the machine, or that part in rear of the ordinary first cutter for dressing the top of the stuff.

A head, A, provided with knives or cutters, as usual, rotates in suitable bearings $a$ $a'$ in the frame, and is driven in any well-known way—such, for instance, as by a belt passing around the pulley $b$ on the end of the shaft B of the rotary cutter-head. A presser-bar, C, shown in this instance as supported and adjustable up and down toward and away from the cutters in guideways D D', is provided on its under surface (which under surface heretofore has come directly in contact with the material being planed) with a series of teeth or pointed cleats, E. These cleats are arranged in a row, extending from end to end of the presser-bar, or nearly so, and at right angles thereto. They project on their under sides below the bottom of the presser-bar, and are generally arranged at distances apart of from one to two inches.

It will be seen that as the stuff being dressed is passed between the cutter and presser-bar it is borne upon above by the cleats only, which are reduced in transverse area, or brought to a point at their ends by beveling their sides, so as to deflect to one side any substances upon the planks, &c., and direct them between the teeth, when they are carried along and escape by the passages formed between the sides of the cleats to the rear of the cutter and bar. Thus not only is any impediment to the feed removed, but the indenting of the stuff is prevented by the projecting clearing-teeth.

The teeth are preferably slightly curved or rounded on their under sides at the points, and secured in the bar by dovetailing, so as readily to be removed, and yet be held, when properly inserted in their seats, against endwise, vertical, and sidewise strains.

I have found by use that cleats made of wood answer better than those of metal; but I do not mean to limit myself to the use of wooden clearing-teeth, as the teeth may obviously be made of metal or other suitable material, if desired.

Obviously, instead of the removable bearing and clearing cleats described, the presser-bar might be provided with rigid ribs on its under surface, projecting in advance of it, and pointed at their ends, and the same results be accomplished as by the removable cleats.

It is also obvious that the clearing and pressing teeth or ribs, instead of projecting in advance of the front edge of the presser-bar, might terminate flush therewith; but I prefer the construction shown, as it gives ample time for the turning of the substances upon the planks and boards to one side, and lessens liability of the clogging of the passages between the teeth.

It will be seen that the upper surface of the stuff, which is, as usual, dressed by the first cutter arranged above the material, is entirely protected against defacement by the pressure of foreign substances by the presser-bar above the second cutter. When one side only is planed, the work is, as usual, done by an upper cutter, and my improved presser-bar is arranged in the rear of said cutter, in the customary position.

I claim as of my own invention—

1. A presser-bar for planing-machines, constructed substantially as hereinbefore set forth, with clearing and bearing ribs or teeth.

2. The combination, substantially as hereinbefore set forth, of the presser-bar, its removable teeth, and the cutter.

In testimony whereof I have hereunto subscribed my name.

EMERY D. BARRETT.

Witnesses:
 JOSEPH I. PEYTON,
 E. C. DAVIDSON.